Figure 1:
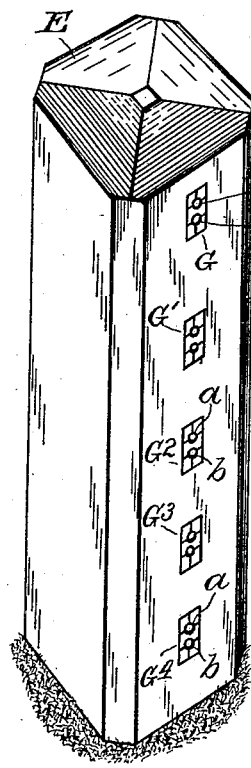

No. 862,522. PATENTED AUG. 6, 1907.
E. T. SILVIUS.
COMPOSITE FENCE POST.
APPLICATION FILED FEB. 27, 1905.

2 SHEETS—SHEET 1.

WITNESSES:
J. H. Gardner
M. D. Beaty

INVENTOR:
Ellis T. Silvius

No. 862,522. PATENTED AUG. 6, 1907.
E. T. SILVIUS.
COMPOSITE FENCE POST.
APPLICATION FILED FEB. 27, 1905.

2 SHEETS—SHEET 2.

WITNESSES:
J. H. Gardner
M. D. Beaty

INVENTOR:
Ellis T. Silvius.

UNITED STATES PATENT OFFICE.

ELLIS T. SILVIUS, OF INDIANAPOLIS, INDIANA.

COMPOSITE FENCE-POST.

No. 862,522.  Specification of Letters Patent.  Patented Aug. 6, 1907.

Application filed February 27, 1905. Serial No. 247,478.

*To all whom it may concern:*

Be it known that I, ELLIS T. SILVIUS, a citizen of the United States, residing at Indianapolis, in the county of Marion and State of Indiana, have invented new and useful Improvements in Composite Fence-Posts; and I do declare the following to be a full, clear, and exact description of the invention, reference being had to the accompanying drawings, and to the letters and figures of reference marked thereon, which form a part of this specification.

This invention relates to the class of fence posts that are designed especially to support wire fencing, and the invention has reference particularly to the devices whereby the wire fencing or other fencing elements may be secured to the posts.

The objects of the invention are, first, to provide permanent concrete fence posts (or those that consist principally of cement, sand and gravel or the like) with improved holders in which ordinary wire staples or other fencing fasteners may be secured in order to fasten the fence-wires or other fencing elements to the posts; second, to provide concrete posts with holders for the fasteners that will permit of the removal of the fasteners and the insertion of new fasteners in cases of necessity; third, to provide concrete posts with fastener-holders that may be renewed and thus be relied upon to last as long as the posts themselves, and which may be produced at relatively small cost.

Other objects of minor importance will become apparent in considering the annexed description of the invention, among which may be mentioned the providing of staple holders of suitable design to be made of cast-iron or other material which will not be liable to corrode or rust when the posts are exposed to the elements.

Broadly, the invention consists in providing concrete posts with fence-fastener holders adapted to retain the fence-fasteners therein, by means of bent or hook-like devices at the extremities of the legs of the fasteners in recesses of the holders; further, in providing concrete posts with removable fastener-holders having keys, for assisting in retaining the holders in place, and also for releasing the fastener-legs and ends so that they may be removed in case the exposed portions of the fasteners corrode and disappear in use.

Specifically, the invention consists in sectional staple-holders of novel form and construction in which the staples may be clenched, and from which the clenched ends of the staples may be readily removed separately, so that new staples may be quickly applied to the holders; and, the invention consists further in the novel parts, and in the combinations and arrangements of parts, as hereinafter particularly described and claimed.

Figure 2:
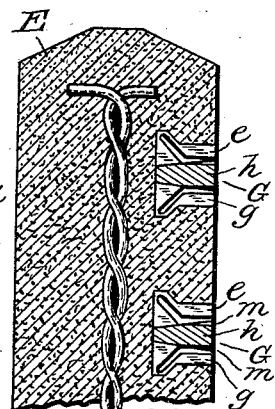
Figure 3:
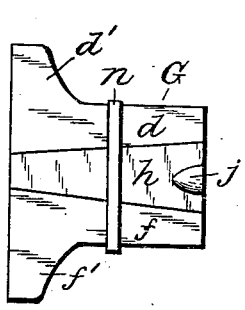
Figure 4:
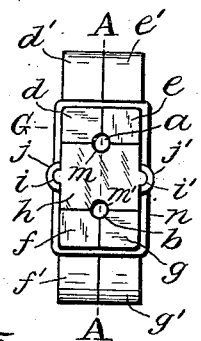
Figure 5:
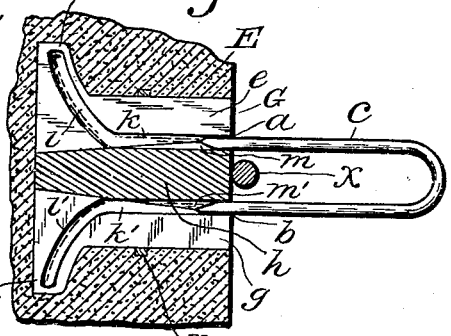
Figure 6:
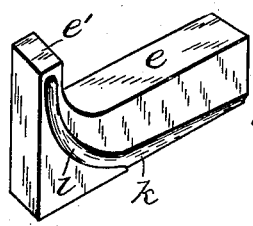
Figure 7:
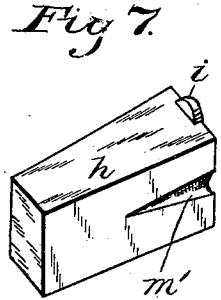
Figure 8:
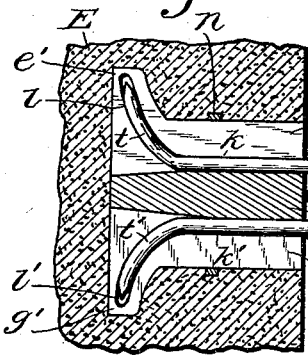
Figure 9:
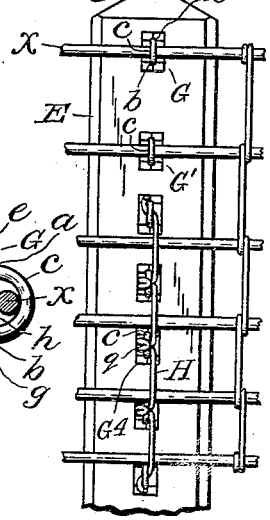
Figure 10:
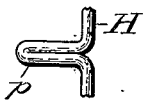
Figure 11:
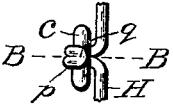
Figure 12:
Figure 13:
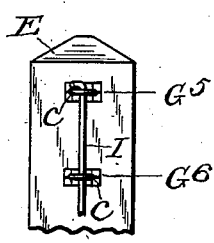
Figure 14:
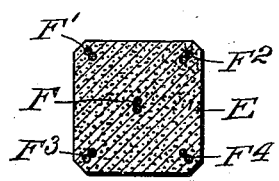
Figure 15:
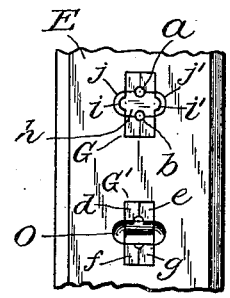
Figure 16:
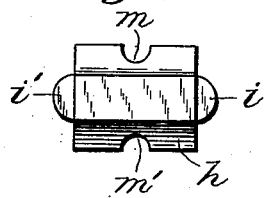
Figure 17:
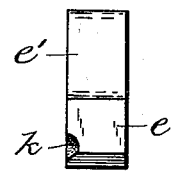
Figure 18:
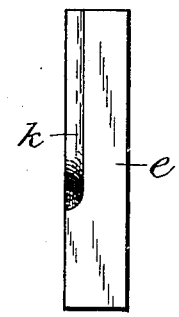
Figure 19:
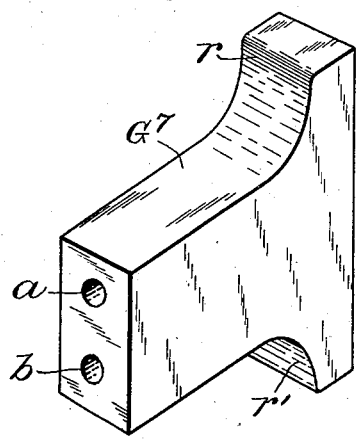
Figure 20:
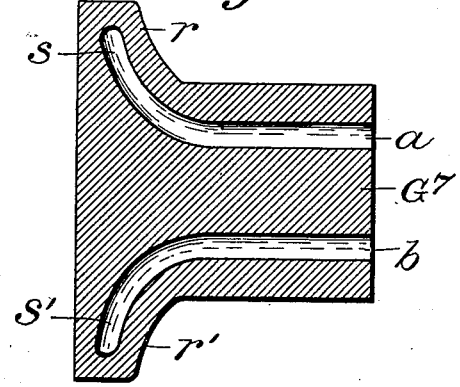

Referring to the drawings, Figure 1 is a perspective view of so much of one of the improved posts as would appear above the ground when set for use, the staple-holders thereof being empty and ready to receive the staples for fastening the fencing to the post; Fig. 2, a fragmentary vertical sectional view of the post at the axis thereof; Fig. 3, a side elevation of one of the improved staple-holders detached from the post; Fig. 4, a front elevation of a staple-holder; Fig. 5, a fragmentary sectional view of a holder at the plane of the line A—A in Fig. 4, arranged in the post, and a staple in position entering the holder; Fig. 6, a perspective view of an end part of one of the staple-holders; Fig. 7, a perspective view of the key comprising a part of a staple-holder; Fig. 8, a fragmentary sectional view of the post having the improved staple-holder in which an ordinary staple is clenched and fastening a fence-wire thereby to the post; Fig. 9, a front elevation of the improved post to which wire fencing is attached partly by means of common staples and partly by means of a locking-wire connected with the staples; Figs. 10, 11, and 12, fragmentary details of parts shown in Fig. 9, Fig. 12 being a section on the line B—B in Fig. 11; Fig. 13, a fragmentary front elevation of the post showing the staple-holders arranged so that a retaining rod may extend vertically through the staples therein; Fig. 14, a horizontal sectional view of the body part of the post; Fig. 15, a fragmentary front elevation of the post including one of the complete staple-holders thereof and also parts of another holder of the preferred form from which the key part has been withdrawn; Fig. 16, a plan view of the holder-key inverted; Fig. 17, a front plan of one of the end parts of the preferred form of holder; Fig. 18, a side elevation of the part shown in Fig. 17; Fig. 19, a perspective view of a one-piece holder; and, Fig. 20, a longitudinal central sectional view of the one-piece holder.

Similar reference characters in the several figures of the drawings designate like parts or features.

In practically carrying out the invention, the concrete element E which comprises the body portion of the post, is formed while in a plastic state in a suitable mold, and may be composed of cement and other suitable materials, and then allowed to become hard. The metallic elements, F, F', F², F³, F⁴, are placed in the plastic composition while the latter is being formed in the mold, and each metallic element consists of two wires twisted together and their ends separated and bent over in opposite directions, there being a metallic element at the axis and four others in the corners of the body portion of the post. The smaller sizes of line posts may contain only one metallic element, and that at the axis thereof.

The staple-holders, G, G', G² G³, G⁴, shown particularly in Figs. 1 to 9 inclusive, as preferably constructed, each have two sockets $a$ and $b$ therein adapted to receive the two legs of an ordinary wire staple $c$, the greater portions of the sockets being straight and parallel one to the other, and extending from the front end of the holder, which is preferably composed of cast-iron, nearly to the inner or rear end thereof, the inner ends of the sockets being designed to retain the ends of a staple and prevent the withdrawal thereof except when intentionally accomplished. Specifically, as shown, the inner ends of the sockets are curved so that when a staple is driven into the sockets, the ends of the staple will be spread apart and clenched in the holder, thereby firmly retaining the staple, yet permitting the staple to be withdrawn if extraordinary force be applied thereto. The sockets are large enough to only permit of free insertion of the staple, so that no injurious amount of moisture can enter and rust the staple therein. Each staple holder may be formed as a single piece if desired, and the sockets be produced by means of cores as will further appear, but preferably the holders are each composed of a number of sections, so that the use of cores may be avoided. The bottom of the mold which is to form the face of the post may be provided with studs on which the staple-holders may be set, the sockets receiving the studs, so that the holders may be arranged uniformly in the posts. Each holder has one or more lateral projections or lugs and is bedded in the concrete portion of the post with the holder front flush with the face of the post, and the projections or lugs prevent the withdrawal of the holder.

In order to provide for the removal of the legs and ends of the staples when the loops of the staples may have perished because of corrosion, so that new staples may be applied, and also to expedite the manufacture of the staple-holders, each holder preferably comprises five parts cast separately and fitted together, there being a part $d$ having a lug $d'$ at its inner end, and a part $e$ having a lug $e'$, comprising a pair of end parts; a part $f$ having a lug $f'$, and a part $g$ having a lug $g'$, comprising another pair of end parts like the parts $d$ and $e$; and a key $h$ of wedge form which is inserted between the two pairs of end parts, the inner or opposing faces of the end parts being inclined to correspond to the inclination of the adjacent faces of the key. The key preferably has lugs $i$ and cores $j$, and will be further described. The parts $d$ and $g$ are alike, and the parts $e$ and $f$ are alike, differing from the parts $d$ and $g$ only in having parts of the sockets in opposite sides thereof. A description of the part $e$, Fig. 6, will suffice for the other end parts. In one corner thereof is a groove $k$ that at the outer end of the part is "quarter-round," the groove being deeper at the body portion of the part and then continuing as a curved "half-round" groove $l$ across the inner face of the part and along the face of the lug $e'$. The part $g$ has a similar oppositely-curved groove $l'$ and straight groove $k'$, so that when the two parts comprising a pair of end parts are placed together there will be a "half-round" groove in the inclined face and a curved circular socket extending from the groove into the lug portions.

The key $h$ has in one inclined side thereof a "half-round" groove $m$ and a like groove $m'$ in the other inclined side thereof, the bottoms of the grooves being parallel and opposite to the grooves in the pairs of end parts. The grooves $m$ and $m'$ extend from the outer end of the key only about half of the distance to the inner end thereof, becoming narrow at their inner ends owing to the inclinations of the faces of the key. Thus when the five parts are assembled the grooves therein form the pair of sockets $a$ and $b$ to receive the staple, and the parts are held together, while being embedded in the composition, by means of a band $n$ which embraces the parts and remains permanently embedded with the holder. Each key $h$ has two lugs $i$ and $i'$ at opposite sides for use in withdrawing the key when necessary, and cores $j$ and $j'$ are formed of frangible material, such as sealing wax or asphaltum, and placed at the inner sides of the lugs to prevent the concrete composition from approaching the lugs, and when necessary the cores may readily be dug out so as to leave recesses as $o$, Fig. 15, in the hard concrete under and at the ends of the lugs to receive instruments whereby the lugs may be engaged in order to withdraw the key. When it may be necessary to place fence wires between any two of the staple-holders, the staples may be used and in connection therewith a rod H having return bends $p$ formed at one side thereof, which are inserted in the staples and bent over to form hooks $q$, the body of the rod extending across the fronts of the fence wires. When it may be desired to use vertical rods I for fastening woven wire fencing to the posts, the staple-holders may be arranged, as $G^5$ and $G^6$, Fig. 13, so that when a number of the staples are applied to the holders the loops thereof may receive the rod I, as shown.

In order to meet requirements of users, the construction of the staple-holders may be variously modified in order to attain economy in production thereof, while at the same time providing that the staples or similar fasteners may be removed from the staple-holders. As an example, a holder may be formed in some cases as a single piece, as above-mentioned, substantially as $G^7$ in Figs. 19 and 20, of suitable material sufficiently hard to cause the fasteners to bend when driven therein, the holder comprising a body having projections $r$ and $r'$, and the sockets $a$ and $b$ in the body having curved portions (or recesses) $s$ and $s'$ extending into the projections and terminating therein.

In practical use when the removable holders are employed, the wires of the fencing are to be placed between the sockets $a$ and $b$, as are the wires $x$ or I, and then the staples $c$ may be entered in the sockets and driven in by means of a hammer or mallet, and when the loops of the staples have drawn the fence wire close to the key $h$ and the face of the post, the ends $t, t'$, will be clenched in the crooked socket ends or recesses, as in Fig. 8, and be thereby securely retained. The staple may, however, be withdrawn, if a powerful lever be applied to the loop. As will be seen in Figs. 8 and 9, the staples and the fence wires securely hold the keys $h$ in their places. In case the staples require to be replaced when the loops thereof have disappeared or become weakened on account of corrosion, any remaining fragments of the loops may be cut off, thus releasing the fence wires and permitting the keys to be withdrawn. After a key has been removed, a staple-leg may be bent out into the space that was occupied by the key, and may then be engaged by grippers whereby the end of the staple may be withdrawn from the curved portion of the socket. Having removed the ends of an old staple, the key may be replaced, and then a new staple may be driven, as before. Also, after removing a key the end parts of a holder may be removed from the post body. The fencing may be attached to the posts by staples or nails driven into the sockets of the single-piece holders in the same manner as above described.

It will be understood that, since the greater portions of the sockets in the staple-holders are straight and have considerable length, they serve as guides, so that in emergency, in lieu of staples, ordinary wire nails may be driven and clenched in the sockets, and then the head-ends of the nails may be bent over to secure the fence wires. Also, nails may be driven into the sockets through wood fence stringers or nailing pieces when such are used.

Various modifications may be made in the contours of the inner ends of the sockets, so that they may be curved in any tortuous manner in order to cause the staple-ends or nail ends to become bent sufficiently to retain them under ordinary conditions of service. Also, the several parts of the removable staple-holders may be variously proportioned so that the end parts may be detached from the concrete body when the keys $h$, which lock them in the body, are removed, thus permitting renewal of the staple-holders in cases of necessity. If desired, each pair of end parts of the holder may be variously formed as a single piece. If desired, the holders may project slightly beyond the post front.

Having thus described the invention, what is claimed as new, is—

1. A concrete fence-post provided with embedded fence fastener holders held removably in the fence-post and having each an opening therein to receive a fence-fastener.

2. A fence fastening device comprising a plurality of parts having grooves therein to form sockets, the parts cooperating one with another, a cooperating wedge-shaped key part, and means for binding all the parts together.

3. A removable fastener holder including a main holder part having a recess in the inner end thereof and a channel communicating with the recess, and a locking key cooperating with the main holder part attachable thereto or detachable therefrom.

4. A concrete fence-post provided with embedded staple-holders comprising end parts and also removable keys between the end parts, the holders having sockets therein formed partially in the end parts and partially in the keys thereof, portions of the sockets being tortuous.

5. A concrete fence-post provided with a removable fastener-holder including a plurality of parts embedded in the fence post and having recesses in the inner ends thereof and channels communicating with the recesses, and a locking key for the plurality of parts of the holder.

6. A concrete fence-post provided with embedded staple-holders each composed of two pairs of end parts, and a key seated between the two pairs of end parts, each holder having a pair of sockets therein and each socket formed jointly in the key and in both of a pair of the end-parts.

7. A concrete fence-post provided with an embedded staple-holder having a plurality of sockets to receive the legs of a staple and comprising a plurality of separate parts one of which parts is wedge-shape and removable, and means within the holder for flexing the legs of the staple.

8. A concrete fence-post provided with embedded staple-holders each comprising an end part that is broader at its inner end than at its outer end and having a tortuous socket extending into the broader inner end thereof, and a removable key locking the end part in the body of the post.

9. A concrete fence-post provided with embedded staple-holders comprising end parts that are broader at their inner ends than at their outer ends and having sockets extending tortuously into the broader inner ends thereof, and a removable key locking the end parts of the holder in the post body and having at the outer end thereof means for removing the key from its normal position.

10. A fence fastening device having sockets therein, a staple in the sockets of the device, and a wedge-shape key forming a part of the fastening device arranged between the legs of the staple and removable therefrom to provide clearance space for the removal of the legs of the staple.

11. A fence fastening device comprising end parts having grooves in opposing faces thereof, a wedge-shape key between the end parts having grooves in the faces of the thicker portions thereof opposite the grooves that are in the faces of the end parts, the grooves collectively forming sockets, and a staple secured in the sockets.

12. A fence fastening device holder comprising a main part having a recess therein to receive and hold the fence-fastening device, and a wedge-shaped key cooperating with the main part and having at the thicker end thereof means to be engaged by a withdrawing tool.

13. The combination, with the concrete element of a composite fence-post, of a staple holder embedded therein and comprising end parts having grooves therein and recesses communicating with the grooves, a key seated removably between the end parts and having at the outer end thereof means whereby the key may be removed from its seated position, and a staple in the grooves and secured in the recesses of the end parts.

14. The combination, with the concrete element of a composite fence-post, of a staple-holder embedded therein and comprising a plurality of end parts having each a groove in a corner thereof and extending therefrom in a face thereof, and a wedge-shape key engaging the end parts opposite the grooves in the corners thereof.

15. A fence including a composite post provided with removable fence-fastener holders embedded therein and having tortuous sockets for flexing fence-fasteners, removable keys locking parts of the holders in the post, fencing elements engaging the keys, and fence-fasteners having parts thereof flexed in the tortuous sockets and engaging the fencing elements.

16. The combination with a concrete fence post, of fence-fastener holders each having a socket therein and comprising a plurality of separately-formed parts provided with means for holding the parts of the holder together independently of the post, each holder and said means being embedded together in the post and the parts of the holder being removable from the post and said means, and a fence fastener secured removably in the socket of the holder.

17. The combination with a concrete fence-post, of fence-fastener holders having each a plurality of parts and embedded in the post, each holder having a lateral external projection and a recess in the projection, a binding band extending about the plurality of parts of the holder and embedded in the post, and a fence-fastener in the holder and having a lateral projection extending into the recess and secured removably therein, there being a guide channel for the fence-fastener to the recess.

18. A fence-fastener holder comprising a body part having projections at an end thereof and provided with a plurality of channels extending from the opposite end thereof continuously and also tortuously into the projections thereof and terminating therein.

19. A fence-post formed of plastic material hardened, a fence-fastener holder comprising a plurality of members joined together and embedded removably in the post, one of the members keying the other member or members in the post and being removable in advance of the other member or members from the post, the holder having a channel therein to receive and hold a part of a fence-fastener.

20. A fence fastener holder composed of a plurality of parts having each an inclined face and a groove therein and having also a recess extending from the groove, and a wedge-shape key comprising a companion of the plurality of parts.

21. A fence fastener holder composed of a plurality of parts, one of the parts having convergently-inclined sides provided with grooves, and the other parts having grooves therein which with the grooves in the said one of the parts form sockets in the holder.

22. A fence-fastener holder having sockets therein and composed of a plurality of pairs of end-parts having each a groove extending along a corner and in a face thereof, and a wedge-shape part adapted to fit between the pairs of end parts and having grooves in opposite sides thereof.

23. A fence-fastener holder comprising a plurality of parts having each a groove therein, a part of each groove being straight and the remaining part thereof being tortuous, the plurality of parts being connectedly joined together, and a binding band extending about the plurality of parts.

24. The combination of a fence post formed of plastic material and having a channelel fence-fastener holder embedded and keyed removably therein and provided with means for removably holding an insertible fence-fastener, and a fence-fastener insertible and retainable in or removable from the holder.

25. Fence-fastening devices each comprising a fastener-holder having a recessed or tortuous opening to receive a part of a fastener, and means coöperating with and removable from the fastener-holder for securing the part of the fastener therein removably.

26. A fence post including a concrete body having fence-fastening means therein comprising each a plurality of members of which one of the members is removable from the remaining member or members and having a lateral projection holding the member removably in the body of the post, for connecting fencing elements detachably to the post.

27. A concrete fence-post provided with a fence fastening holder embedded removably therein and having an opening to receive a leg of a fence-fastener, the holder including a section thereof normally extending into a recess of the post, and a section thereof normally holding the other section in the recess of the post and removable from the post to permit of the removal of the other section.

28. A fence-fastener holder comprising a main member having a channel therein to receive a leg of a fence-fastener, and a wedge-shape key seated removably against the main member for normally retaining the leg in the channel, the leg being removable when the key is removed from the main member.

29. A fence fastener holder including two or more parts, one part being a removable key for releasing the other part or parts, the holder having recesses for receiving and holding fence-fasteners.

30. A fence-post formed of plastic material having a plurality of sockets therein to receive fence-fastener holders, each socket having a lateral recess in communication therewith, a holder inserted into the socket and having a projection entering the recess, the holder having an opening to receive a fastener, and a key inserted in the socket and holding the projection of the holder in the recess of the socket.

31. A fence-post formed of plastic material having a plurality of sockets in the body thereof, each socket having a communicating lateral recess within the body of the post, and a plurality of coöperating fence-fastening devices inserted in the socket and having a part extending into the recess thereof, one of the said devices being movable and normally locking the remaining device or devices in the socket.

32. The combination with a fence-post formed of plastic material with a plurality of sockets formed therein and with metallic binders bedded in the fence-post, of a fencing-fastener device insertible into or removable from either one of the sockets of the fence-post, means for normally securing the device removably in the said socket, and means for releasing the device for removal from the socket.

33. The combination with a holder having an opening therein to receive a fencing-fastener, of means for anchoring the holder in plastic material, a fencing-fastener insertible into or removable from the opening of the holder to engage a fencing element, means for normally securing the fencing-fastener removably in the holder, and means for releasing the fencing-fastener for removal from the holder.

In testimony whereof, I affix my signature in presence of two witnesses.

ELLIS T. SILVIUS.

Witnesses:
  WM. H. PAYNE,
  S. SNIDER.